United States Patent Office 3,365,448
Patented Jan. 23, 1968

3,365,448
ACRYLATE DERIVATIVES
George Y. Lesher, Schodack, N.Y., assignor to Sterling Drug Inc., New York, N.Y., a corporation of Delaware
No Drawing. Filed Aug. 11, 1964, Ser. No. 388,940
6 Claims. (Cl. 260—240)

This invention relates to acrylic acid derivatives.

The invention resides in the composition of matter having a molecular structure in which a lower-alkyl acrylate is substituted in the α-position of the acrylic acid moiety by 4-nitrobenzoyl and in the β-position by lower-alkylamino, phenylamino, pyridylamino, di - (lower - alkyl) amino, N-(lower-alkyl)-N-phenylamino, N-(lower-alkyl)-N-pyridylamino, piperidino, pyrrolidino, morpholino and piperazino.

Among the compounds of my invention are those of Formula I $$O_2N-\underset{}{\underset{}{\bigcirc}}-\overset{O}{\underset{\|}{C}}-\underset{\|}{\overset{}{C}}-\overset{O}{\underset{\|}{C}}-O-R$$
$$\overset{}{\underset{CHNB}{\|}}$$

I where R is lower-alkyl, NB is $$N\diagdown_{R_2}^{R_1}$$

piperidino, (lower - alkylated) - piperidino, pyrrolidino, (lower-alkylated)-pyrrolidino, morpholino and (lower-alkylated)-morpholino, $R_1$ is lower-alkyl, phenyl or pyridyl, and $R_2$ is hydrogen or lower-alkyl. Optionally, the aromatic rings of Formula I, i.e., 4-nitrophenyl of 4-nitrobenzoyl, and phenyl or pyridyl designated as $R_1$, can be substituted by low-molecular weight substituents, e.g., halo, lower-alkyl, lower-alkylmercapto, lower-alkanoylamino, lower-alkylamino, amino, hydroxy, and the like, at any of the available ring positions and where more than one substituent is present, they can be the same or different and they can be in any of the various position combinations relative to each other. The halo substituents can be chloro, bromo, iodo or fluoro.

The term "lower-alkyl," as used herein, e.g., as the meaning for R or as one of the meanings for $R_1$ or $R_2$ in Formula I, means alkyl radicals having from one to six carbon atoms and is illustrated by methyl, ethyl, n-propyl, isopropyl, n-butyl, 2-butyl, isobutyl, n-amyl, iso-amyl, n-hexyl, 3-hexyl, and the like. Similarly, other terms using the adjective "lower," i.e., lower-alkylmercapto, lower-alkylamino and lower-alkanoylamino, means such radicals having from one to six carbon atoms.

The compounds of Formula I are prepared reacting a lower - alkyl α-(ethoxymethylene) - α-(4 - nitrobenzoyl) acetate (II) with an amine, H—NB (III), as follows: Piperidino, pyrrolidino or morpholino when "lower-alkylated" can have lower-alkyl substituents at any available ring position.

$$O_2N-\underset{}{\underset{}{\bigcirc}}-\overset{O}{\underset{\|}{C}}-\underset{\|}{\overset{}{C}}-COOR + H-NB \longrightarrow$$
$$\overset{}{\underset{CHOC_2H_5}{\|}}$$

II     III $$O_2N-\underset{}{\underset{}{\bigcirc}}-\overset{O}{\underset{\|}{C}}-\underset{\|}{\overset{}{C}}-COOR$$
$$\overset{}{\underset{CHNB}{\|}}$$

I

The reaction is illustrated in the specific examples below.

The compounds of Formula I have been tested by standard in vitro bacteriological evaluation procedures and found to possess antibacterial activity for example, against *Staphylococcus aureus*, *Eberthella typhi*, *Clostridium welchii* and *Pseudomonas aeruginosa*, at test concentration levels in the range of about 0.050 mg./cc. to about 1.0 mg./cc., as illustrated in the examples below.

The molecular structures of the compounds of my invention are established by their mode of synthesis and corroborated by the correspondence of calculated and found values for the elementary analyses and by infrared (IR) spectral and nuclear magnetic resonance (NMR) analyses.

The following examples will further illustrate the invention without, however, limiting it thereto.

EXAMPLE 1

The preparation of the intermediate lower-alkyl α-(ethoxymethylene) - α - (4-nitrobenzoyl)acetate is illustrated as follows for the ethyl ester: A mixture containing 98 g. of ethyl 4-nitrobenzoylacetate, 105 g. of triethyl orthoformate and 145 g. of acetic anhydride was heated with stirring on a steam bath for forty-eight hours. The reaction mixture was then evaporated by heating in vacuo using the bath temperature of 135° C. to yield, as an oily residue, the crude intermediate, ethyl α-(ethoxymethylene)-α-(4-nitrobenzoyl)acetate, which was used without further purification in the following examples to prepare the final products.

The corresponding methyl, isopropyl, n-butyl or n-hexyl α-(ethoxymethylene-α-(4-nitrobenzoyl)acetate is obtained by following the above procedure using molar equivalent quantities of methyl, isopropyl, n-butyl or n-hexyl 4-nitrobenzoylacetate in place of ethyl-4-nitrobenzoylacetate.

EXAMPLE 2

*Ethyl β-diethylamino - α - (4-nitrobenzoyl)acetate.*—To 14.6 g. of ethyl α-(ethoxymethylene)-α-(4-nitrobenzoyl) acetate was added slowly with cooling and stirring 10 ml. of diethylamine. The reaction mixture was stirred at room temperature for one hour and then allowed to stand at room temperature overnight. The excess diethylamine was removed by heating the mixture on a steam bath in vacuo and the residual material was taken up in ethylene dichloride. The resulting solution was washed successively with 2 N hydrochloric acid, 5% aqueous potassium bicarbonate solution and water; dried over anhydrous potassium carbonate; treated with decolorizing charcoal and filtered; and then evaporated. The oily residue was triturated with cyclohexane with cooling whereupon solidification resulted. The solid was recrystallized twice using small volumes of n-butanol and using decolorizing charcoal the second time to yield 5.5 g. of the product, ethyl β-diethylamino - α - (4-nitrobenzoyl)acrylate, M.P. 57.8–59.2° C. (corr.).

*Analysis.*—Calcd. for $C_{16}H_{20}N_2O_5$: C, 59.98; H, 6.28; N, 8.74. Found: C, 59.78; H, 6.36; N, 8.85.

The structure of the above compound was confirmed by nuclear magnetic resonance analysis.

When tested by standard in vitro bacteriological evaluation procedures, ethyl β-diethylamino - α - (4 - nitrobenzoyl)acrylate was found to have both bacteriostatic and bactericidal activities against *Clostridium welchii* at a concentration of 0.075 mg./cc.

EXAMPLE 3

*Ethyl β-ethylamino-α-(4-nitrobenzoyl)acrylate.*—To a solution containing 14.6 g. of ethyl α-(ethoxymethylene)-α-(4-nitrobenzoyl)acetate in 50 ml. of ethanol was added 15 ml. of ethylamine in 100 ml. of ethanol with stirring at room temperature. The reaction mixture was allowed to stand at room temperature for thirty minutes; the precipitated product was collected and recrystallized from isopropyl alcohol to yield 8.0 g. of ethyl β-ethylamino-α-(4-nitrobenzoyl)acrylate, M.P. 137.2–138.0° C. (corr.).

Analysis.—Calcd. for C₁₄H₁₆N₂O₅: C, 57.53; H, 5.52; N, 9.59. Found: C, 57.86; H, 5.72; N, 9.80.

Ethyl β-ethylamino-α - (4 - nitrobenzoyl)acrylate was found to have bacteriostatic activity against *Pseudomonas aeruginosa* at a concentration of 0.10 mg./cc.

EXAMPLE 4

*Ethyl β-methylamino-α-(4-nitrobenzoyl)acrylate.* — A mixture containing 14.6 g. of ethyl α-(ethoxymethylene)-α-(4-nitrobenzoyl)acetate and 50 ml. of 40% methylamine in water was stirred for one hour. The resulting precipitate was collected and recrystallized from isopropyl alcohol using decolorizing charcoal to yield 11 g. of ethyl β-methylamino-α-(4-nitrobenzoyl)acrylate, M.P. 153.6–154.8° C. (corr.).

Analysis.—Calcd. for C₁₃H₁₄N₂O₅: C, 56.11; H, 5.07; N, 10.07. Found: C, 56.27; H, 5.28; N, 10.02.

Ethyl β-methylamino-α-(4-nitrobenzoyl)acrylate was found to have both bacteriostatic and bactericidal activities against *Clostridium welchii* at a concentartion of 0.10 mg./cc.

EXAMPLE 5

*Ethyl β - (4 - bromoanilino) - α - (4 - nitrobenzoyl) acrylate.*—A solution containing 1.7 g. of 4-bromoanilino in 10 ml. of ethanol was added to a solution of 2.9 g. of ethyl α-(ethoxymethylene)-α-(4-nitrobenzoyl)acetate in 10 ml. of ethanol at room temperature and the reaction mixture was stirred for one hour. The resulting precipitate was collected and recrystallized from isopropyl alcohol to yield 4.5 g. of ethyl β-(4-bromoanilino)-α-(4-nitrobenzoyl)acrylate, M.P. 155.0–156.8° C. (corr.).

Analysis.—Calcd. for C₁₈H₁₅BrN₂O₅: Br, 19.06; N, 6.68. Found: Br, 19.28; N, 6.65.

The structure of the above compound was confirmed by nuclear magnetic resonance analysis.

Ethyl β-(4-bromoanilino)-α-(4-nitrobenzoyl)acrylate was found to have bacteriostatic activity against *Staphylococcus aureus*, *Eberthella typhi*, *Clostridium welchii* and *Pseudomonas aeruginosa* at respective concentrations of 0.10, 0.10, 0.10 and 0.075 mg./cc.

EXAMPLE 6

*Ethyl β-(6-methyl-2-pyridylamino)-α-(4-nitrobenzoyl) acrylate.*—To a solution containing 14.6 g. of ethyl α-(ethoxymethylene)-α-(4-nitrobenzoyl)acetate in 40 ml. of ethanol was added 5.4 g. of 2-amino-6-methylpyridine in 30 ml. of ethanol and the resulting mixture was stirred for one hour. The precipitate was collected and recrystallized from isopropyl alcohol using decolorizing charcoal to yield 13 g. of ethyl β-(6-methyl-2-pyridylamino)-α-(4-nitrobenzoyl)acrylate, M.P. 176.2–177.0° C. (corr.).

Analysis.—Calcd. for C₁₈H₁₇N₃O₅: C, 60.81; H, 4.82; N, 11.83. Found: C, 61.10; H, 5.06; N, 11.75.

Ethyl β-(6-methyl-2-pyridylamino)-α-(4-nitrobenzoyl) acrylate was found to have bacteriostatic and bactericidal activities against *Staphylococcus aureus* at respective concentrations of 0.05 and 0.10 mg./cc., and to have bacteriostatic activity against *Eberthella typhi*, *Clostridium welchii* and *Pseudomonas aeruginosa* at respective concentrations of 0.10, 0.075 and 0.10 mg./cc.

EXAMPLE 7

*Methyl β-dimethylamino-α-(4-nitrobenzoyl)acrylate* is prepared following the procedure described in Example 2 using molar equivalent quantities of methyl α-(ethoxymethylene)-α-(4-nitrobenzoyl)acetate and dimethylamine.

EXAMPLE 8

*Isopropyl β-di-n-butylamino-α-(4-nitrobenzoyl)acrylate* is prepared following the procedure described in Example 2 using molar equivalent quantities of isopropyl α-(ethoxymethylene)-α-(4-nitrobenzoyl)acetate and di-n-butylamine.

EXAMPLE 9

*n-Butyl β-n-hexylamino-α-(4-nitrobenzoyl)acrylate* is prepared following the procedure described in Example 3 using molar equivalent quantities of n-butyl α-(ethoxymethylene)-α-(4-nitrobenzoyl)acetate and n-hexylamine.

EXAMPLE 10

*n-Hexyl β-(N-methylanilino)-α-(4-nitrobenzoyl)acrylate* is prepared following the procedure described in Example 5 using molar equivalent quantities of n-hexyl α-(ethoxymethylene) - α - (4-nitrobenzoyl)acetate and N-methylaniline.

EXAMPLE 11

*Ethyl α-(4-nitrobenzoyl)-β-(4-pyridylamino)acrylate* is prepared following the procedure described in Example 6 using molar equivalent quantities of ethyl α-(ethoxymethylene)-α-(4-nitrobenzoyl)acetate and 4-aminopyridine.

EXAMPLE 12

*Ethyl α-(4-nitrobenzoyl)-β-(3-pyridylamino)acrylate* is prepared following the procedure described in Example 6 using molar equivalent quantities of ethyl α-(ethoxymethylene) - α - (4-nitrobenzoyl)acetate and 3-aminopyridine.

EXAMPLE 13

*Ethyl β-(N-methyl-2-pyridylamino)-α-(4-nitrobenzoyl) acrylate* is prepared following the procedure described in Example 6 using molar equivalent quantities of ethyl α-(ethoxymethylene)-α-(4-nitrobenzoyl)acetate and 2-methylaminopyridine.

EXAMPLE 14

*Ethyl α-(4-nitrobenzoyl)-β-piperidinoacrylate* is prepared following the procedure described in Example 2 using molar equivalent quantities of ethyl α-(ethoxymethylene)-α-(4-nitrobenzoyl)acetate and piperidine.

EXAMPLE 15

*Ethyl β-(3-ethylpiperidino)-α-(4-nitrobenzoyl)acrylate* is prepared following the procedure described in Example 2 using molar equivalent quantities of ethyl α-ethoxymethylene)-α-(4-nitrobenzoyl)acetate and 3-ethylpiperidine.

EXAMPLE 16

*Ethyl β-(2,6-dimethylpiperidino)-α-(4-nitrobenzoyl)acrylate* is prepared following the procedure described in Example 2 using molar equivalent quantities of ethyl α-(ethoxymethylene)-α-(4-nitrobenzoyl)acetate and 2,6-dimethylpiperidine.

EXAMPLE 17

*Ethyl α-(4-nitrobenzoyl)-β-pyrrolidinoacrylate* is prepared following the procedure described in Example 2 using molar equivalent quantities of ethyl α-(ethoxymethylene)-α-(4-nitrobenzoyl)acetate and pyrrolidine.

EXAMPLE 18

*Ethyl β-(2-methylpyrrolidino)-α-(4-nitrobenzoyl)acrylate* is prepared following the procedure described in Example 2 using molar equivalent quantities of ethyl α-(ethoxymethylene) - α - (4-nitrobenzoyl)acetate and 2-methylpyrrolidin.

EXAMPLE 19

*Ethyl β-morpholino-α-(4-nitrobenzoyl)acrylate* is prepared following the procedure described in Example 2 using molar equivalent quantities of ethyl α-(ethoxymethylene)-α-(4-nitrobenzoyl)acetate and morpholine.

I claim:
1. A compound of the formula

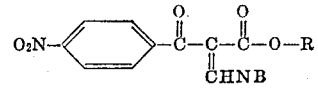

where R is lower-alkyl, NB is a member of the group consisting of

piperidino, (lower-alkylated)-piperidino, pyrrolidino, (lower-alkylated)-pyrrolidino, morpholino and (lower-alkylated)-morpholino, $R_1$ is a member selected from the group consisting of lower-alkyl, phenyl and pyridyl, $R_2$ is a member selected from the group consisting of hydrogen and lower-alkyl.

2. Ethyl β-diethylamino-α-(4-nitrobenzoyl)acrylate.
3. Ethyl β-ethylamino-α-(4-nitrobenzoyl)acrylate.
4. Ethyl β-methylamino-α-(4-nitrobenzoyl)acrylate.
5. Ethyl β - (4-bromoanilino)-α-(4-nitrobenzoyl)acrylate.
6. Ethyl β - (6 - methyl - 2 - pyridylamino) - α - (4-nitrobenzoyl)acrylate.

References Cited

Panizzi, Gazz. Chim. Ital., vol. 73, pp. 13 to 19 (1943).

JOHN D. RANDOLPH, *Primary Examiner.*

UNITED STATES PATENT OFFICE
CERTIFICATE OF CORRECTION

Patent No. 3,365,448                      January 23, 1968

George Y. Lesher

It is certified that error appears in the above identified patent and that said Letters Patent are hereby corrected as shown below:

Column 2, line 29, "α-(ethoxymethylene-α-" should read -- α-(ethoxymethylene)-α- --; line 35, "acetate" should read -- acrylate --.

Signed and sealed this 13th day of January 1970.

(SEAL)
Attest:

Edward M. Fletcher, Jr.              WILLIAM E. SCHUYLER, JR.
Attesting Officer                      Commissioner of Patents